United States Patent
Gauna (10) Patent No.: US 6,909,239 B2
(45) Date of Patent: Jun. 21, 2005

(54) DUAL LED/INCANDESCENT SECURITY FIXTURE

(75) Inventor: Kevin Wayne Gauna, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/616,313

(22) Filed: Jul. 8, 2003

(65) Prior Publication Data
US 2005/0007025 A1 Jan. 13, 2005

(51) Int. Cl.[7] ................................................. H01J 1/60
(52) U.S. Cl. .................. 315/134; 315/308; 340/693.11
(58) Field of Search ........................ 315/130, 133–134, 315/136, 307–308, 360; 340/541, 573.1, 693.7, 693.11

(56) References Cited

U.S. PATENT DOCUMENTS

| | | | | |
|---|---|---|---|---|
| 5,818,338 A | * | 10/1998 | Ferraro | 340/568.1 |
| 5,867,099 A | * | 2/1999 | Keeter | 340/567 |
| 5,946,209 A | * | 8/1999 | Eckel et al. | 700/14 |
| 6,078,257 A | * | 6/2000 | Ferraro | 340/568.1 |
| 6,121,875 A | * | 9/2000 | Hamm et al. | 340/540 |
| 6,151,529 A | * | 11/2000 | Batko | 700/28 |
| 6,320,506 B1 | * | 11/2001 | Ferraro | 340/568.1 |
| 6,741,176 B2 | * | 5/2004 | Ferraro | 340/568.1 |

* cited by examiner

Primary Examiner—Thuy Vinh Tran
(74) Attorney, Agent, or Firm—Pack Vaughan & Fleming LLP

(57) ABSTRACT

A dual LED and incandescent security lighting system uses a hybrid approach to LED illumination. It combines an ambient LED illuminator with a standard incandescent lamp on a motion control sensor. The LED illuminator will activate with the onset of darkness (daylight control) and typically remain on during the course of the night ("always on"). The LED illumination, typically amber, is sufficient to provide low to moderate level lighting coverage to the wall and ground area adjacent to and under the fixture. The incandescent lamp is integrated with a motion control circuit and sensor. When movement in the field of view is detected (after darkness), the incandescent lamp is switched on, providing an increased level of illumination to the area. Instead of an "always on" LED illuminator, the LEDs may also be switched off when the incandescent lamp is switched on.

21 Claims, 7 Drawing Sheets

DUAL LED/INCANDESCENT SECURITY FIXTURE

GOVERNMENT RIGHTS

The United States Government has the rights in this invention pursuant to Contract No. DE-AC03-76SF00098 between the United States Department of Energy and the University of California.

BACKGROUND OF THE INVENTION

The invention relates generally to LED lighting systems and more particularly to security lighting systems with LEDs.

As LED technology progresses, LEDs will be used for many lighting applications. White light LEDs are still in their infancy and questions regarding their color rendering and lifetime need to be resolved before wide scale commercial adoption. Colored LEDs, however, are a proven technology, and as outputs continue to increase, colored lighting opportunities will be further enabled. Exit signs and traffic signals are examples of colored lighting markets that have seen widespread commercial success by LEDs and soon may be dominated if not monopolized by LEDs.

Security lighting, particularly in outdoor environments, is a lighting application of great interest. LEDs are not the ideal choice because white light is generally needed and only colored LEDs are generally available. Incandescent lights can be used but consume much more energy. Thus a security lighting system with the advantageous features of both LEDs and incandescent lamps without their limitations is highly desired.

SUMMARY OF THE INVENTION

The invention is a dual Led and incandescent security lighting system that uses a hybrid approach to LED illumination. It combines an ambient LED illuminator with a standard incandescent lamp on a motion control sensor. The LED portion will activate with the onset of darkness (daylight control) and typically remain on during the course of the night ("always on"). The LED illumination, typically amber, is sufficient to provide low to moderate level lighting coverage to the wall and ground area adjacent to and under the fixture. The incandescent lamp is integrated with a motion control circuit and sensor. When movement in the field of view is detected (after darkness), the incandescent lamp is switched-on, providing an increased level of illumination to the area. Instead of an "always on" LED illuminator, the LEDs may also be switched off when the incandescent lamp is switched on.

DETAILED DESCRIPTION OF THE INVENTION

The invention may be Implemented in a number of different embodiments. The following are illustrative but not limiting.

Figure 1:
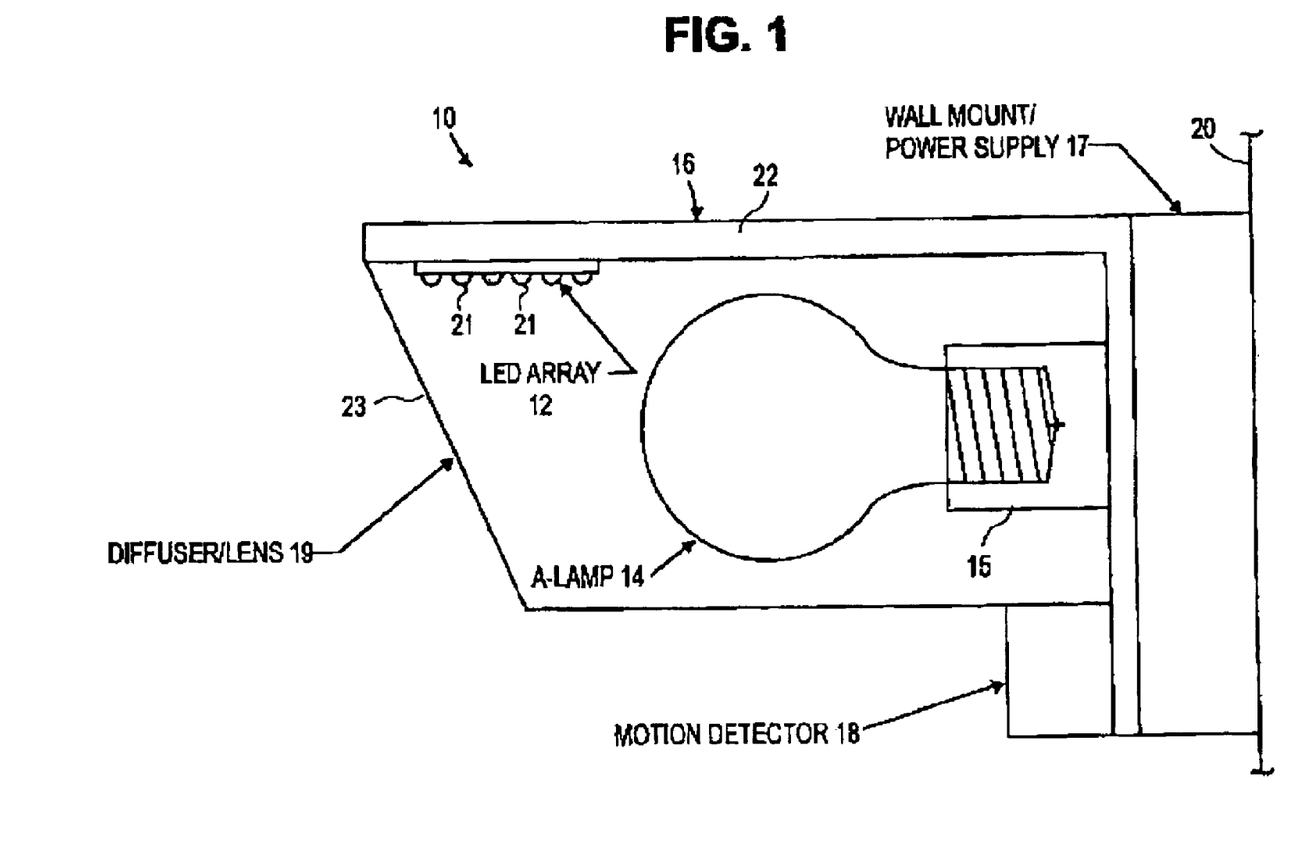
FIG. 1 shows a dual LED/incandescent security lighting system of the invention.

As shown in FIG. 1, hybrid LED/incandescent light fixture 10 combines an LED array 12 and an incandescent lamp (A-lamp) 14 in a single housing 16. The incandescent source or lamp 14 screws into a standard socket 15 and is held in a horizontal position. The LED array 12 is placed facing down from the top 22 of the housing 16, near the front edge, and extending forward substantially beyond A-lamp 14. The top 22 of housing 16 not only supports the LED array 12 but also provides a heatsink for the LED array 12 and provides a physical shield to prevent light from either the LED array 12 or A-lamp 14 from traveling upwards into the night sky. Housing 16 is attached to a wall mount/power supply unit 17, which is attached to wall 20 and electrically connected to a power source, typically standard electrical wiring from a power line. Socket 15 and LED array 12 are electrically connected to unit 17 for power. A motion detector 18 is mounted below housing 16 (or elsewhere) and is also electrically connected to unit 17 for power. The control system for fixture 10 is contained in unit 17.

Also forming a part of housing 16, extending down from top 22 and surrounding or enclosing LED array 12 and A-lamp 14, is a diffuser or lens 19, which typically is a diffuser but also may be a clear lens. The front part 23 of diffuser/lens 19 is typically tapered inwardly from top to bottom. LED array 12 includes a plurality of LEDs 21. The LEDs are typically amber or yellow in color, but may be other colors or even white. A-lamp 14 may be replaced by a halogen lamp, or compact fluorescent lamp, or other lamp. Diffuser/lens 19 allows the light from LED array 12 and from A-lamp 14 to pass to the local environment, generally illuminating the area around fixture 10. Diffuser/lens 19 is typically formed of flat or roughened panes of clear or translucent glass or plastic.

In operation, a sensor detects the occurrence of darkness and turns on the LED array 12. After that, whenever motion sensor 18 detects motion in the vicinity of fixture 10, the A-lamp 14 is switched on, and remains on for a preset time. LED array 12 may remain on when A-lamp 14 is on, or it may shut off to conserve energy and to prevent color shadows.

The construction of the fixture 10 is such that the light output is directed down, mitigating light pollution issues. This fixture is intended as a replacement fixture: it either replaces a porch light in a retrofit application, or is used in new construction as an alternative to another porch light.

Figure 2:
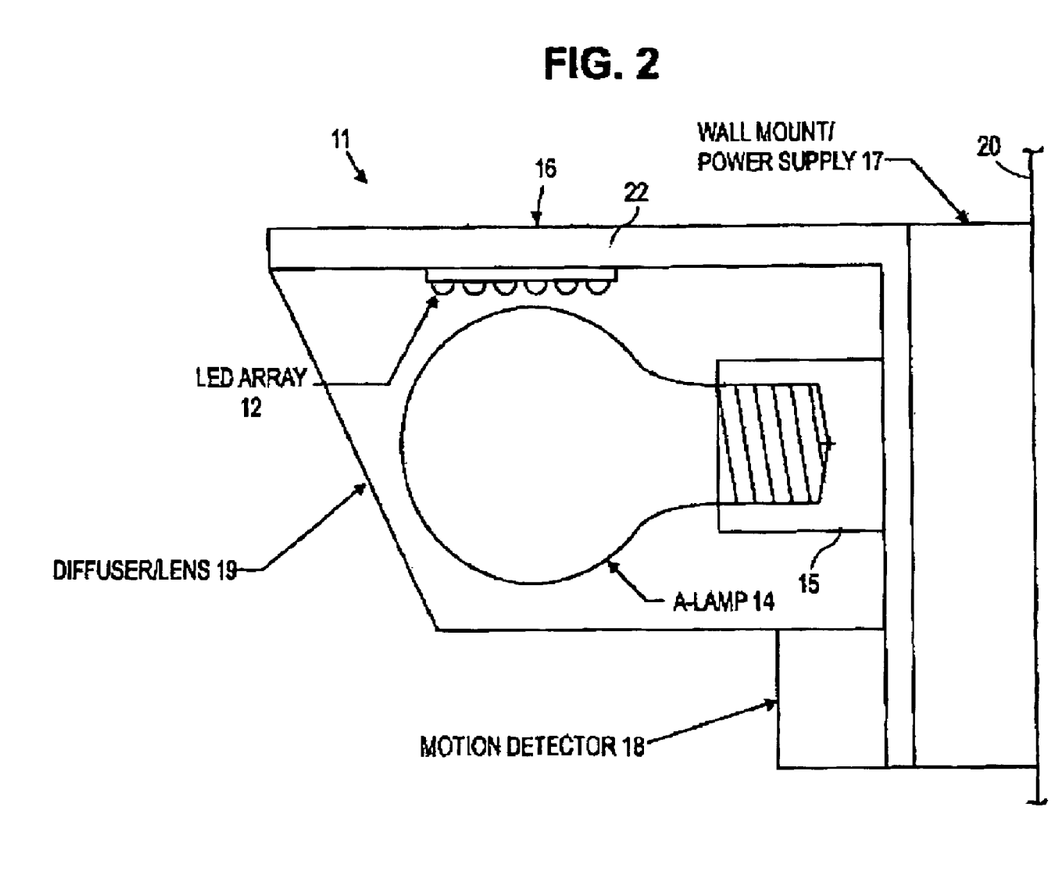
FIG. 2 shows a variation of the dual LED/incandescent security lighting system of FIG. 1.

FIG. 2 shows a dual LED/incandescent fixture which is very similar to fixture 10 of FIG. 1 except for the position of LED array 12 relative to A-lamp 14. In fixture 11, LED array 12 is recessed into housing 16 so that it is over A-lamp 14. Most of the light from LED array 12, then passes through A-lamp 14, which acts as a diffuser, so lens 19 is then typically clear. The remaining components are the same as in FIG. 1.

Figure 3:
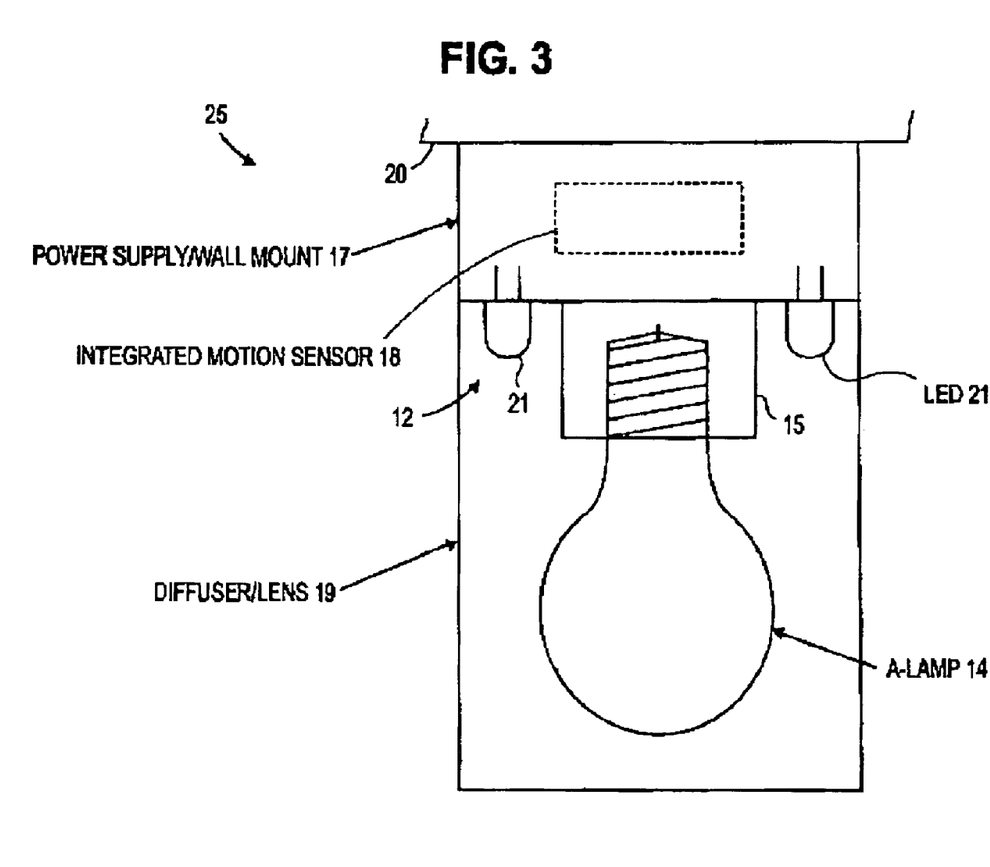
FIGS. 3–5 show other embodiments of the dual LED/incandescent security lighting system of the invention.

FIG. 3 shows an alternate embodiment of the invention with the incandescent lamp 14 in a lamp down orientation. The LEDs 21 are mounted in a ring around the base of the A-lamp 14. Dual LED/incandescent fixture 25 incorporates many of the same components as fixtures 10, 11 but in a different arrangement. Fixture 25 hangs down from a wall or overhang 20. Power supply/wall mount unit 17 is attached under wall 20 and contains the electrical connections to the power source and the control system. Socket 15, into which A-lamp 14 screws, is mounted under and electrically connected to unit 17. LEDs 21 are mounted on and electrically connected to unit 17, forming an array 12. Motion sensor 18 is integrated into unit 17. Diffuser/lens 19 extends down from unit 17 and encloses and surrounds LEDs 21 and A-lamp 14.

Figure 4:
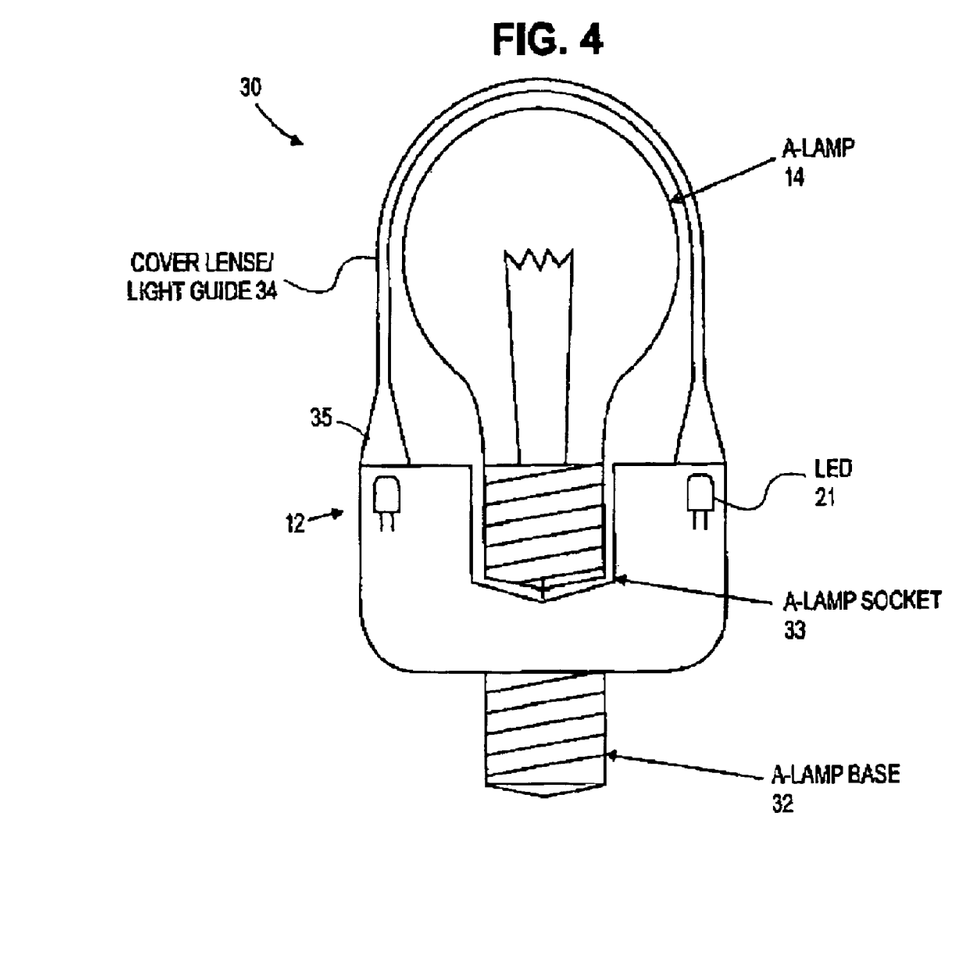

FIG. 4 shows another embodiment of the invention that is intended as a screw-in retrofit. In the dual fixture 30, the LEDs 21 and associated electronics are integrated into a screw-in A-lamp type base 32. This base 32 then receives a standard A-lamp, 14 in A-lamp socket 33. Base 32 screws into a standard socket in a wall which is connected to electrical power, e.g. in a standard porch light fixture. A-lamp 14 and LEDs 21 are thereby electrically connected to a power source. A light guide or cover lens 34 that attaches to the base 32 may be necessary to control the light distribution, as well as mitigate direct glare from the LEDs 21. LEDs 21 are arranged in an array 12 around the edge of base 32 and are aligned with an input section 35 of light guide/lens 34.

Figure 5:
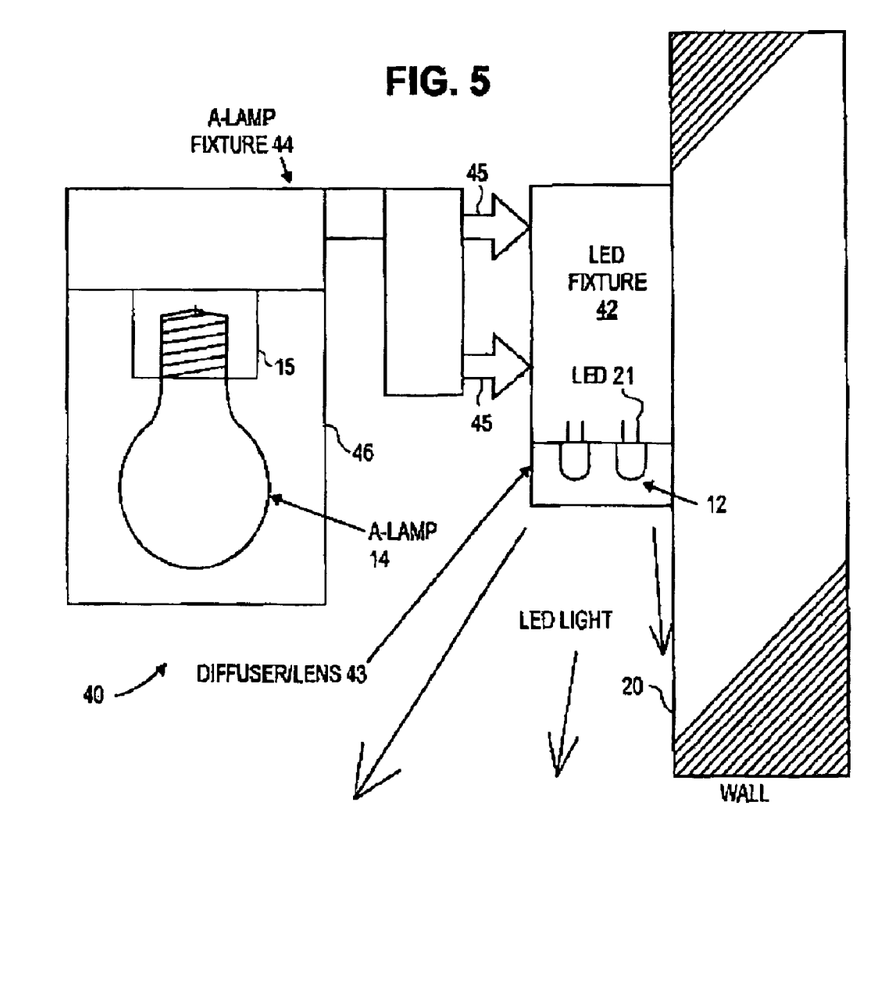

In an alternate embodiment shown in FIG. 5, dual LED/incandescent system 40 separates the LED lighting component from the incandescent lighting fixture. There are separate side-by-side fixtures, LED fixture 42 and A-lamp fixture 44. A-lamp fixture 44 is essentially a standard porch light fixture. LED fixture 42 attaches to wall 20, e.g. at an outdoor junction box. An array 12 of LEDs 21 is mounted in LED fixture 42, facing downward, and enclosed or surrounded by a diffuser/lens 43. LED fixture 42 is built to receive an A-lamp fixture 44 on its front surface, as shown by arrows 45. A-lamp fixture 44 includes a downward facing incandescent lamp 14, which screws into electrical socket 15. A diffuser/lens 46 encloses and surrounds A-lamp 14. The electronics, including the motion sensor, are typically mounted in LED fixture 42.

Figure 6:
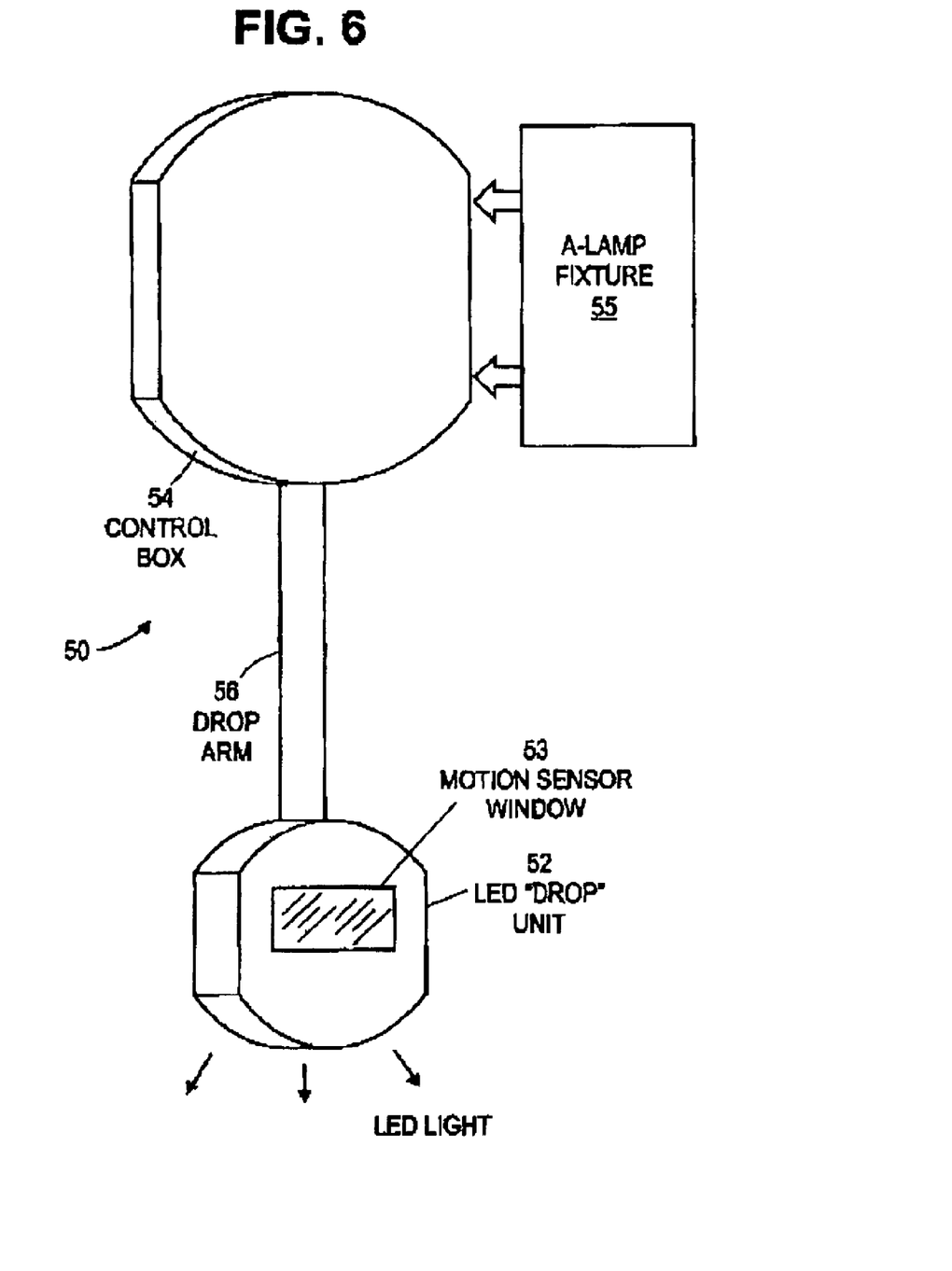
FIG. 6 shows another embodiment of the dual LED/incandescent security lighting system of the invention with a separate LED drop unit.

Another embodiment of the invention, shown in FIG. 6, also separates the LED light component from the incandescent fixture. But instead of having the LED, motion sensor, and control electronics in the same box, dual LED/incandescent system 50 has an LED "drop" unit 52 under the main incandescent unit control box 54. Control box 54 is configured to mount onto a wall. The front surface is configured to receive a standard "porch light" type fixture 55 (similar to fixture 44 in FIG. 5). Control box 54 typically contains the LED driver circuit, the motion control circuit, and the daylight sensing circuit. Drop unit 52 contains the LEDs and the motion-sensor, which operates through motion sensor window 53. Drop unit 52 is connected to main unit 54 by drop arm 56. The drop arm could have an adjustable length, and could be set by the end user according to the particular installation environment. This "drop" feature accomplishes several things. It lowers the LED emitters, reducing the problem of direct glare from the LEDs and increasing the illuminance on the ground below the fixture. It allows the motion sensor unit, also incorporated into the drop unit, to clear the porch light fixture and see the appropriate field of view for proper motion sensing operation. It also separates the heat generating LEDs from the rest of the unit, keeping this heat away from the control electronics.

Figure 7:
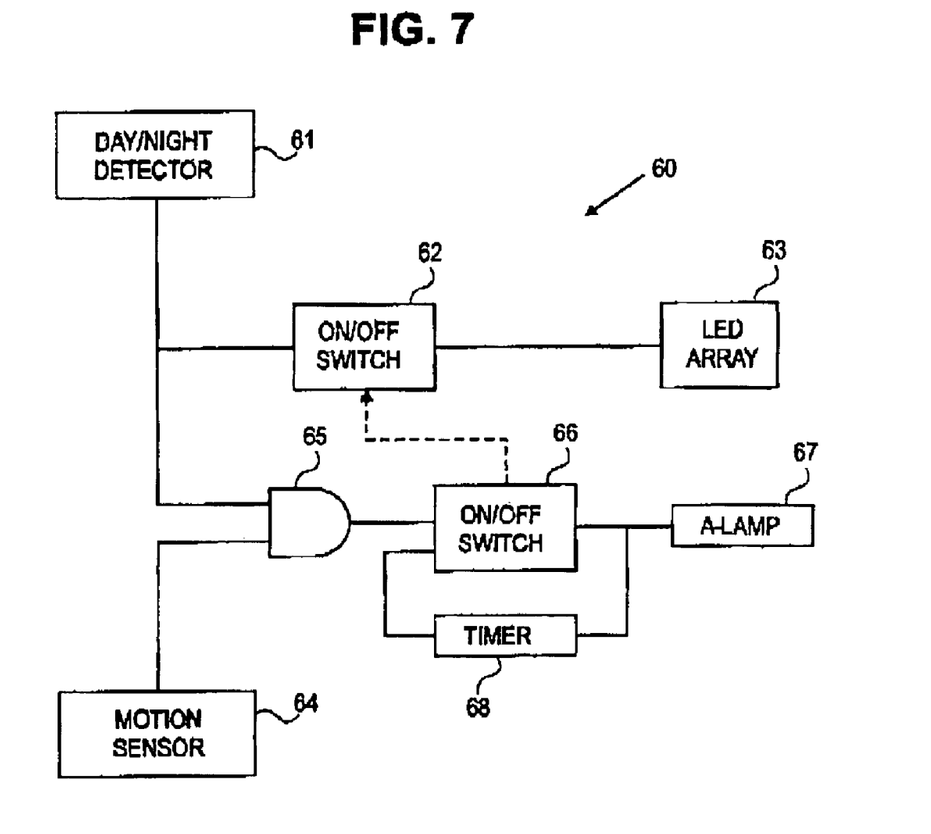
FIG. 7 is a block diagram of a control system for the dual LED/incandescent lighting system of the invention.

FIG. 7 illustrates a control system 60 for the dual LED/incandescent lighting system of the invention. A detector 61 detects the onset of darkness and actuates a switch 62 which turns on LED array 63. During darkness, when motion sensor 64 detects motion, its output signal is combined with the output signal from detector 61, e.g. in AND gate 65, to actuate a second switch 66 to turn on A-lamp 67. Once A-lamp 67 is turned on, a timer 68 which is also actuated by switch 66 may be used to turn off A-lamp 67 after a preset and selectable period of time. Switch 66, when turned on, may also turn off switch 62 to shut off the LED array 63 when A-lamp 67 is on.

This type of hybrid approach to LED illumination has the following advantages and benefits.

1) The LED source (one or more LEDs in an array) consumes a relatively small amount of power compared to the incandescent source, yielding substantial energy savings without a loss in functionality.
2) The LED source provides ambient illumination to the area, eliminating the "all-or-nothing" effect of traditional motion sensor fixtures.
3) The LED source will have a very long lifetime, ensuring at least some illumination to the control area when the incandescent lamp fails.
4) With colored LED sources, the motion activated incandescent lamp will provide a color change when triggered, increasing the conspicuousness of the motion activation and increasing the security benefit of the trigger.
5) With colored LED sources, different nighttime aesthetics can be achieved.
6) The combination of the LED source(s) and the incandescent source yields the best dollars per lumen ratio for the target applications. The number of (expensive) LEDs is kept to a minimum while, at the same time, the incandescent lamp provides a high lumen output for good visibility when the application area is occupied.

Changes and modifications in the specifically described embodiments can be carried out without departing from the scope of the invention which is intended to be limited only by the scope of the appended claims.

What is claimed is:

1. A dual LED and incandescent security lighting system, comprising:
    an ambient LED illuminator;
    an incandescent lamp positioned in proximity to the LED illuminator;
    a darkness sensor for detecting an occurrence of darkness;
    a motion sensor for detecting motion around the lighting system;
    a control system connected to the darkness sensor and the motion sensor and to the LED illuminator and the incandescent lamp for turning on the LED illuminator when darkness is detected and for then turning on the incandescent lamp when motion is detected.

2. The dual lighting system of claim 1 wherein the LED illuminator comprises an array of LEDs.

3. The dual lighting system of claim 2 wherein the LEDs are amber or yellow.

4. The dual lighting system of claim 1 further comprising a single fixture containing both the LED illuminator and the incandescent lamp.

5. The dual lighting system of claim 4 wherein the fixture comprises a substantially flat top with the LED illuminator mounted to the underside of the top and the incandescent lamp is mounted in a substantially horizontal orientation below the top, the LED illuminator being positioned either in front of or above the incandescent lamp.

6. The dual lighting system of claim 5 wherein the fixture further comprises a diffuser or lens extending down from the top and enclosing or surrounding the LED illuminator and the incandescent lamp.

7. The dual lighting system of claim 4 wherein the fixture comprises a base to which the LED illuminator and the incandescent lamp are mounted in a vertical downward position, with the LED illuminator around the lamp, and a diffuser or lens extending down from the base and enclosing or surrounding the LED illuminator and the lamp.

8. The dual lighting system of claim 4 further comprising a lamp base that screws into a standard electrical light socket, the LED illuminator being mounted in the base, and a lamp socket formed in the base for receiving the incandescent lamp.

9. The dual lighting system of claim 8 further comprising a light guide or cover lens attachable to the base, in alignment with the LED illuminator and enclosing and surrounding the incandescent lamp.

10. The dual lighting system of claim 1 further comprising a pair of adjacent fixtures, one containing the LED illuminator and the other containing the incandescent lamp.

11. The dual lighting system of claim 10 wherein the incandescent lamp fixture plugs into the LED fixture.

12. The dual lighting system of claim 1 further comprising:
- a control box containing the control system and mounted to a wall;
- a fixture containing the incandescent lamp attached to the front of the control box;
- an adjustable drop arm extending down from the control box;
- a LED drop unit containing the LED illuminator and the motion sensor connected to the adjustable drop arm and through the drop arm to the control box.

13. The dual lighting system of claim 1 wherein the control system includes a timer for keeping the incandescent lamp on for a selectable preset period of time.

14. The dual lighting system of claim 1 wherein the control system turns the LED illuminator off when the incandescent lamp is on.

15. The dual lighting system of claim 1 wherein the control system comprises:
- a first on/off switch connected between the darkness sensor and the LED illuminator;
- an AND gate having inputs connected to the darkness sensor and the motion sensor;
- a second on/off switch connected between the AND gate and the incandescent lamp.

16. The dual lighting system of claim 15 comprising a presetable timer connected in feedback to the second on/off switch.

17. The dual lighting system of claim 15 wherein the second on/off switch is connected to the first on/off switch.

18. A dual LED and security lighting system, comprising:
- an ambient LED illuminator,
- means for positioning an A-lamp in proximity to the LED illuminator;
- a darkness sensor for detecting an occurrence of darkness;
- a motion sensor for detecting motion around the lighting system;
- a control system connected to the darkness sensor and the motion sensor and to the LED illuminator and the A-lamp for turning on the LED illuminator when darkness is detected and for then turning on the A-lamp when motion is detected.

19. The dual LED and security lighting system of claim 18, wherein said A-lamp comprises:
a halogen lamp.

20. The dual LED and security lighting system of claim 18, wherein said A-lamp comprises:
a compact fluorescent lamp.

21. The dual LED and security lighting system of claim 18, wherein said A-lamp comprises:
an incandescent amp.

* * * * *

UNITED STATES PATENT AND TRADEMARK OFFICE
CERTIFICATE OF CORRECTION

PATENT NO. : 6,909,239 B2 Page 1 of 1
DATED : June 21, 2005
INVENTOR(S) : Kevin Wayne Gauna It is certified that error appears in the above-identified patent and that said Letters Patent is hereby corrected as shown below:

Column 6,
Line 31, please delete the word "amp" and replace with the word -- Lamp --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,909,239 B2
DATED : June 21, 2005
INVENTOR(S) : Kevin Wayne Gauna et al.

It is certified that error appears in the above-identified patent and that said Letters Patent is hereby corrected as shown below:

Title page,
Item [75], Inventors, add:
-- Erik R. Page, Winters, CA
 (US)
 Michael Siminovitch, Woodland, CA
 (US) --.

Signed and Sealed this

Fourteenth Day of March, 2006

JON W. DUDAS
*Director of the United States Patent and Trademark Office*